US006978397B2

(12) United States Patent
Chan

(10) Patent No.: US 6,978,397 B2
(45) Date of Patent: Dec. 20, 2005

(54) MEMORY CONTROLLER SUPPORTING REDUNDANT SYNCHRONOUS MEMORIES

(75) Inventor: Jong Chan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 09/846,868

(22) Filed: May 1, 2001

(65) Prior Publication Data

US 2001/0016920 A1    Aug. 23, 2001

Related U.S. Application Data

(62) Division of application No. 09/085,204, filed on May 27, 1998, now Pat. No. 6,243,829.

(51) Int. Cl.[7] .............................................. G06F 11/00
(52) U.S. Cl. ......................................... 714/12; 714/11
(58) Field of Search .................................... 714/11, 12

(56) References Cited

U.S. PATENT DOCUMENTS

| | | | |
|---|---|---|---|
| 5,088,021 A * | 2/1992 | McLaughlin et al. | 700/82 |
| 5,202,822 A * | 4/1993 | McLaughlin et al. | 700/82 |
| 5,274,645 A | 12/1993 | Idleman et al. | 714/6 |
| 5,526,507 A | 6/1996 | Hill | 395/441 |
| 5,548,711 A | 8/1996 | Brant | 395/182.03 |
| 5,625,796 A | 4/1997 | Kaczmarczyk et al. | 711/168 |
| 5,632,013 A | 5/1997 | Krygowski et al. | 714/7 |
| 5,734,818 A * | 3/1998 | Kern et al. | 714/20 |
| 5,790,775 A | 8/1998 | Marks et al. | 714/9 |
| 5,933,653 A | 8/1999 | Ofek | 714/5 |
| 6,021,454 A | 2/2000 | Gibson | 710/129 |
| 6,041,381 A | 3/2000 | Hoese | 710/129 |
| 6,061,772 A | 5/2000 | Webber et al. | 711/169 |
| 6,073,209 A | 6/2000 | Bergsten | 711/114 |
| 6,073,218 A * | 6/2000 | DeKoning et al. | 714/6 |
| 6,085,333 A * | 7/2000 | DeKoning et al. | 714/7 |
| 6,279,078 B1 * | 8/2001 | Sicola et al. | 711/119 |
| 6,389,554 B1 * | 5/2002 | Jung et al. | 714/6 |
| 6,578,158 B1 * | 6/2003 | Deitz et al. | 714/11 |
| 6,694,449 B2 * | 2/2004 | Ghameshlu et al. | 714/11 |
| 2002/0133744 A1 * | 9/2002 | Oldfield et al. | 714/11 |

* cited by examiner

*Primary Examiner*—Robert Beausoliel
*Assistant Examiner*—Michael Maskulinski
(74) *Attorney, Agent, or Firm*—Clare T. Hartnett

(57) ABSTRACT

A reliable fault-tolerant I/O controller supporting redundant synchronous memories is described. The I/O controller includes multiple I/O control logic units where each I/O control logic unit is in communication with a host server and external peripheral devices. Each I/O control logic unit includes a processor, a memory, and a memory controller. A master I/O control logic unit services I/O transactions from the host server and the external peripheral devices. A slave I/O control logic unit operates in a quiescent state until the master I/O control logic unit experiences a memory failure. At such time, the slave I/O control logic unit resumes operation of the I/O controller. In order to facilitate the switchover from the master I/O control logic unit to the slave I/O control logic unit, the master memory controller performs concurrent memory write operations in both the master and slave memories. The concurrent memory write operations ensure that the memories in both I/O control logic units are in a consistent state in order for the switchover to occur without loss of data.

12 Claims, 10 Drawing Sheets

MEMORY CONTROLLER SUPPORTING REDUNDANT SYNCHRONOUS MEMORIES

CROSS REFERENCE TO RELATED APPLICATION(S)

This is a divisional of application Ser. No. 09/085,204 filed on May 27, 1998, now U.S. Pat. No. 6,243,829.

FIELD OF THE INVENTION

The present invention relates generally to computer systems using input/output (I/O) controllers. More particularly, the invention relates to a fault tolerant I/O controller having redundant synchronous memories.

BACKGROUND OF THE INVENTION

The performance of server systems has been limited by the low bandwidth associated with I/O subsystems. Attempts to improve this performance bottleneck have been geared towards increasing the I/O bandwidth. However this causes an increase in the number of I/O interrupts received by the server. The increased number of I/O interrupts unnecessarily consumes the server's time thereby degrading the overall performance of the server.

To overcome this bottleneck, a separate I/O processor or controller is typically used to perform the tasks that would normally be performed by the server to handle I/O processing. The use of an I/O controller reduces the overhead incurred by the server to process the I/O interrupts and related I/O processing tasks thereby increasing I/O throughput and improving the performance of the server. For these reasons, most server systems utilize an I/O controller to interface between external peripheral devices and the server.

FIG. 1 illustrates an exemplary computer system 100 utilizing an I/O controller 102. There is shown an I/O controller 102 connected to a primary peripheral component interconnect (PCI) bus 104 and to external I/O devices 106 through a small computer system interface (SCSI) channel 108. The I/O controller 102 includes a secondary PCI bus 110 to which is connected a processor 112, a memory controller 114, a SCSI controller 116, and a PCI-to-PCI bridge 118. The PCI-to-PCI bridge 118 connects the devices coupled to the secondary PCI bus 110 with the devices connected to the primary PCI bus 104. A host central processing unit (CPU) (not shown) is in communication with the primary PCI bus 104. The memory controller 114 is connected to an external memory device 120.

The processor 112 is dedicated to handling I/O requests received from the host CPU. These I/O requests can be to access data from one of the external I/O devices 106. The SCSI controller 116 interfaces with the external I/O devices 106 to transmit and retrieve data to and from these devices 106. The memory 120 is used as a temporary storage area to store data that is in transit between the host CPU and the external I/O devices 106. For instance, data that is written onto an external I/O device 106 is stored in the memory 120 so that it can be encoded with parity bytes prior to storage. Likewise, data that is read from an external I/O device 106 is stored in the memory 120 so that it can be decoded before it is transmitted to the host CPU.

A drawback with the design of this particular I/O controller 102 is that it is not fault tolerant. In the event the memory 120 fails, all I/O activity ceases. Such a memory failure is apparent when an intolerable number of parity errors is detected. Since the I/O controller 102 does not have a redundant memory, all I/O activity ceases thereby severely degrading the performance of the computer system 100. Accordingly, there exists a need for a reliable I/O controller that can accommodate memory failures.

SUMMARY OF THE INVENTION

The present invention pertains to a reliable fault-tolerant I/O controller supporting redundant synchronous memories. The I/O controller is coupled to a host server through a Fibre Channel and to external peripheral devices or data units through an Ultra2 SCSI Channel. The I/O controller includes multiple I/O control logic units where each I/O control logic unit is coupled to the host server through the Fibre Channel link and the external peripheral devices through the Ultra2 SCSI channel.

Preferably, there are two I/O control logic units that each contain the same components and are intended to replace each other in the event one of the I/O control logic units malfunctions. A master I/O control logic unit act as the master unit receiving I/O transactions from the host server and the external peripheral devices. The slave I/O control logic unit acts a slave unit that is in a quiescent state performing small tasks until the master device becomes non-operational. The memories in each I/O control logic unit are synchronized so that in the event the master I/O control logic unit malfunctions, the slave I/O control logic unit can resume processing the I/O transactions.

Each I/O control logic unit includes a processor, a memory controller, as well as other components, coupled to a PCI bus. The memory controller in each I/O control logic unit is coupled to a memory device through a respective memory bus. The memory controller in the master I/O control logic unit performs memory write operations in both the master and slave memories. The concurrent memory write operations ensure that the memories in both I/O control logic units are in a consistent state so that the slave I/O control logic unit can resume processing without any loss of data in the event the master memory device fails.

Each memory bus includes address, control, and data signal paths that enable a memory access to a respective memory device. The master memory controller generates the address and control signals to perform a memory write access to the master and slave memory device. The data signals are received in the master I/O control unit from a processor bus. Each signal path in both I/O control units has a respective bus switch that when enabled allows the signals from the master memory bus to propagate to the slave memory bus thereby initiating a memory access in both the master and slave memory devices.

Each memory controller includes an arbitration logic unit, a bus switch control unit, and a reset and fail logic unit. The arbitration logic unit in the master memory controller controls access to the master and slave memory buses. The arbitration logic unit in the slave memory controller obtains access to the slave memory bus from the master arbitration logic unit. The bus switch control logic unit controls the operation of the respective bus switches associated with each memory bus.

Each reset and fail logic unit is used to control the operational state of the respective memory controller. When the reset and fail logic unit in the master memory controller receives an indication that the slave memory device has experienced a memory failure, the master reset and fail logic unit prepares the master memory controller to operate in sole control mode. In sole control mode, the master memory controller does not perform concurrent memory write operations to the slave memory device. When the reset and fail logic unit in the slave memory controller receives an indication that the master memory device has experienced a memory failure, the slave memory reset and fail logic unit prepares the slave memory controller to act as the master thereby processing the I/O activity from the server and the external peripheral devices.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
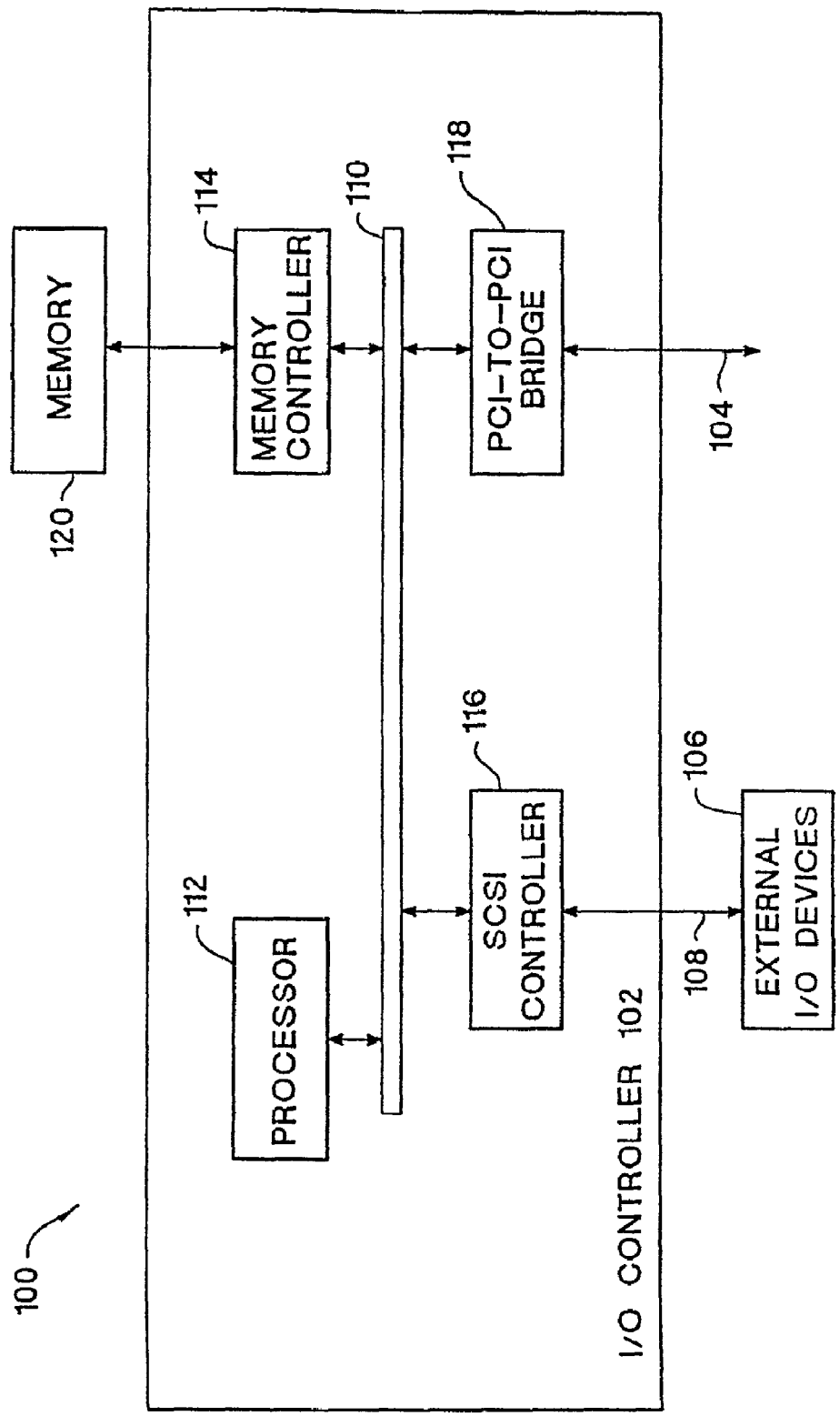
FIG. 1 illustrates an exemplary prior art I/O controller.
Figure 2:
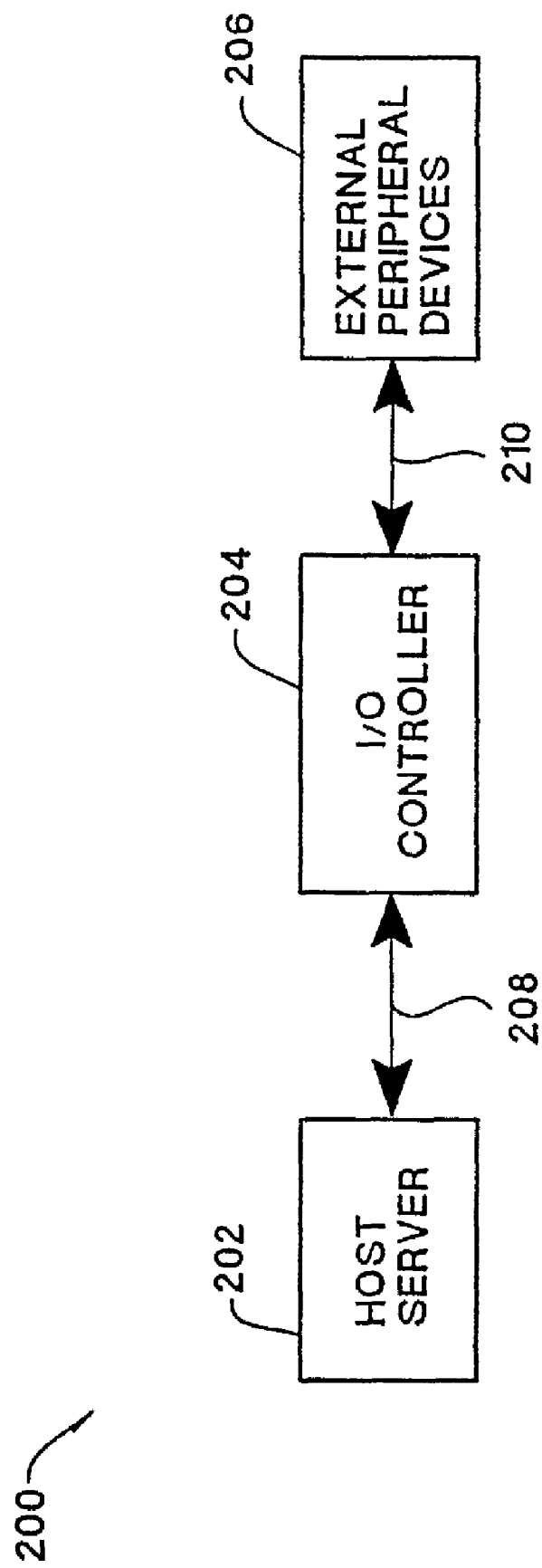
FIG. 2 is a block diagram illustrating the components of a computer system in accordance with a preferred embodiment of the present invention.

FIG. 2 illustrates a computer system 200 employing the technology of the present invention. There is shown a computer system 200 including a host server 202, an I/O controller 204, and external peripheral devices 206. The host server 202 can be any type of computer or data processor such as but not limited to personal computers, workstations, server machines, mainframes, and the like. Preferably, the host server 202 is a server computer from the Hewlett Packard NetServer product line. The I/O controller 204 is any type of processing device that has the ability to control the exchange of data between an external processor and peripheral devices. In a preferred embodiment, the 110 controller 204 is an Intelligent I/O (120) controller supporting the 120 specification. The external peripheral devices 206 can be any type of data unit such as but not limited to storage devices, disk drives, tape drives, CD ROM devices, and the like.

The host server 202 is coupled to the I/O controller 204 by a first communications link 208. The first communications link 208 can be any type of interconnection mechanism such as but not limited to networks, buses, channels and the like. Preferably, the first communications link 208 is a Fibre Channel. The I/O controller 204 is coupled to one or more external peripheral devices 206 though a second communications link 210. The second communications link 210 can be any type of interconnection mechanism such as but not limited to networks, buses, channels, and the like. Preferably, the second communications link 210 is an Ultra2 SCSI channel.

Figure 3:
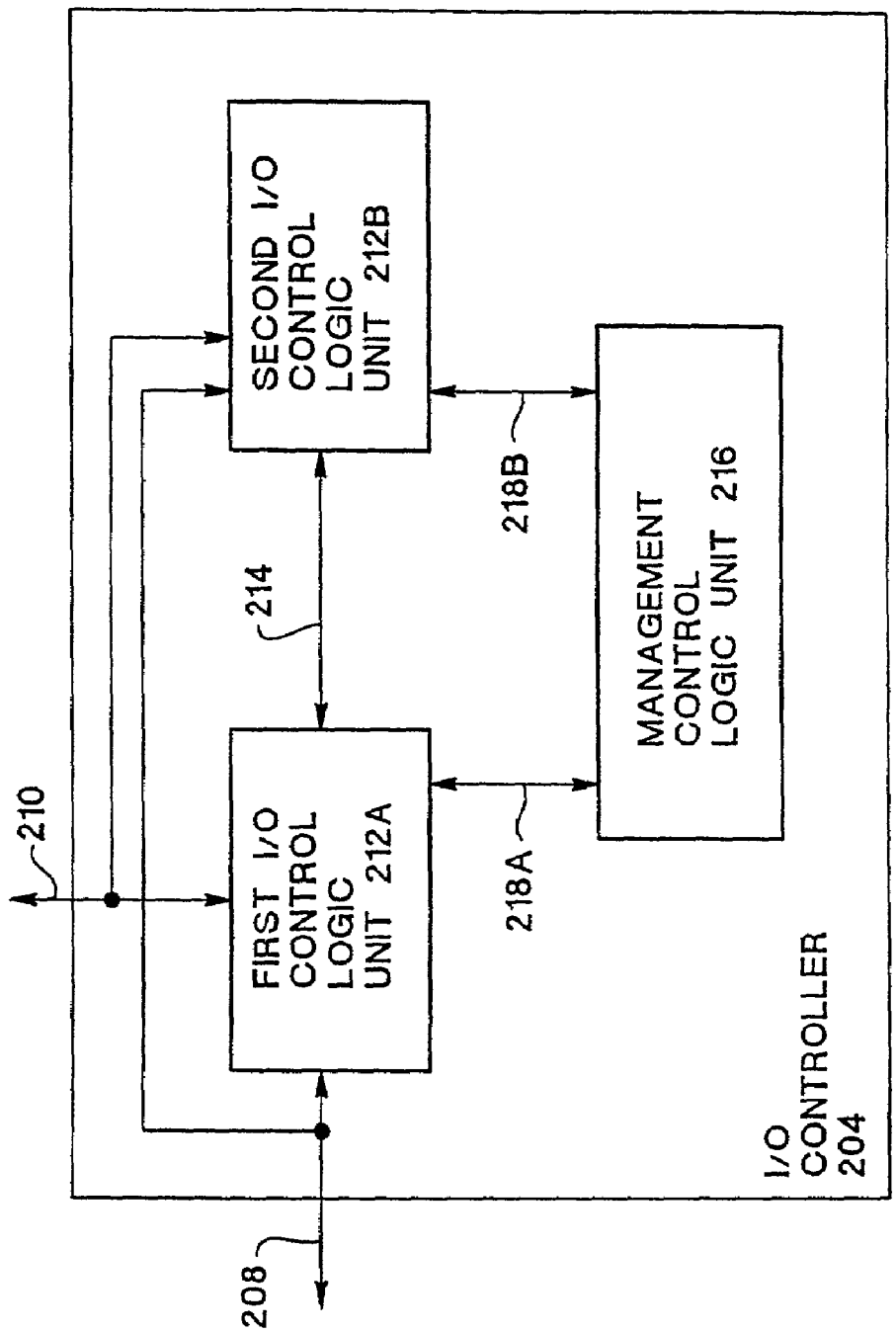
FIG. 3 is a block diagram illustrating the components of the I/O controller shown in FIG. 2 in accordance with a preferred embodiment of the present invention.

FIG. 3 illustrates the I/O controller 204. There is shown a first I/O control logic unit 212A, a second I/O control logic unit 212B, and a management control logic unit 216. The first and second I/O control logic units 212A, 212B are used to control the exchange of data between the host server 202 and the external peripheral devices 206. The management control logic unit 216 monitors the operational status of the first and second I/O control logic units 212A, 212B as well as perform other tasks. The first I/O control logic unit 212A, the second I/O control logic unit 212B, and the management control logic unit 216 are connected through several signal paths 218A, 218B. Preferably, each logic unit 212,216 is implemented as a separate printed circuit board.

The first I/O control logic unit 212A is connected to the first communications link 208 and the second communications link 210. The second I/O control logic unit 212B is also connected to the first and second communications links 208, 210. The first and second I/O control logic units 212 communicate through several sideband signals 214 which will be described in more detail below.

The first and second I/O control logic units 212A, 212B contain the same components and are intended to replace each other in the event one of the I/O control logic units 212 malfunctions. In a preferred embodiment, one of the I/O control logic units 212 acts as the master unit receiving I/O transactions from the host server 202. The alternate I/O control logic unit 212 acts a slave unit that is in a quiescent state performing small tasks until the master device becomes non-operational. The memories in each I/O control logic unit 212 are synchronized so that in the event the master I/O control logic unit 212 malfunctions, the slave or alternate I/O control logic unit 212 can resume processing the I/O transactions. For illustration purposes only, the first I/O control logic unit 212A is referenced in this document as the master I/O control logic unit 212A and the second I/O control logic unit 212B is referenced as the slave I/O control logic unit 212B.

Figure 4:
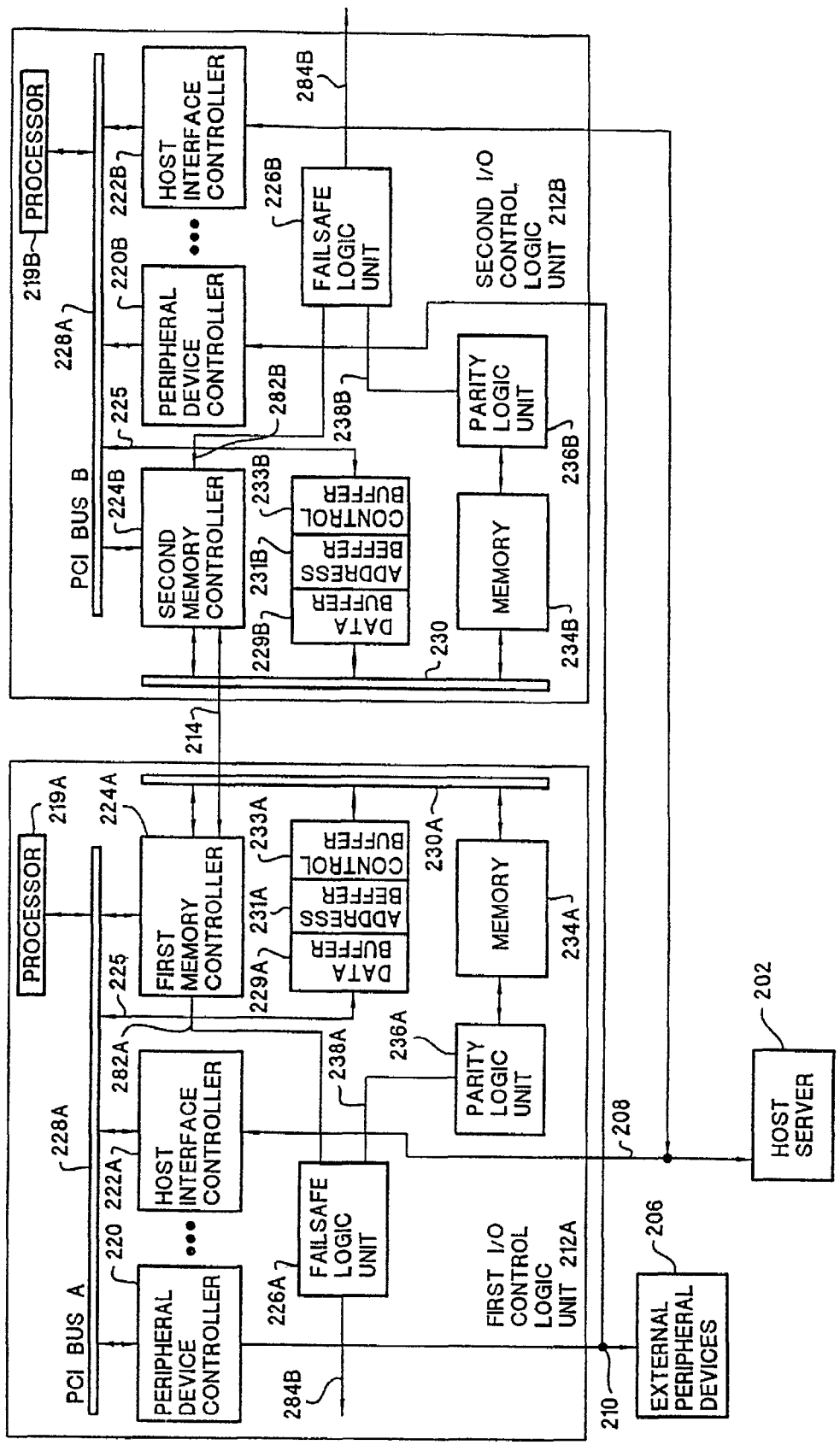
FIG. 4 is a block diagram illustrating the components of the I/O control logic units shown in FIG. 3 in accordance with a preferred embodiment of the present invention.

FIG. 4 illustrates the components of the first and second I/O control logic units 212A, 212B. Each I/O control logic unit 212 includes a processor 219, a peripheral device controller 220, a host interface controller 222, a memory controller 224, a fail safe logic unit 226, a data buffer 229, an address buffer 231, a control buffer 233, a memory 234, and a parity logic unit 236. The processor 219, the peripheral device controller 220, the host interface controller 222, and the memory controller 224 are connected to an internal PCI bus 228.

The processor 219 manages the operation of the I/O control logic unit 212. Preferably, the processor 219 is the StrongArm processor manufactured by Digital Equipment Corporation.

The peripheral device controller 220 interfaces with the external peripheral devices 206 through the second communications link 210. Preferably, the peripheral device controller 220 is a SCSI controller that is tailored to handle communications through the Ultra2 SCSI channel 210. An example of such a controller 220 includes but is not limited to the Adapted PCI-to-SCSI controller (part # AIC-7896).

The host interface controller 222 interfaces with the host server 202 through the first communications link 208. Preferably, the host interface controller 222 is a Fibre Channel controller that is tailored to handle communications through the Fibre Channel 210. An example of such a controller 222 includes but is not limited to the Adapted PCI-to-Fibre Channel Controller (part # AIC-1160).

The memory controller 224 controls access to the memory 234. The memory 234 is used as temporary storage for data that is transmitted between the host server 202 and the external peripheral devices 206, to manipulate data in accordance with auto RAID functions (i.e., stripping, encoding parity bytes, interleaving, mirroring, etc.), and for other purposes. The memory controller 224 is coupled to a set of buffers 229, 231, 233 and the memory 234 through a memory bus 230 which will be described below. The memory controller 224 can be any type of programmable logic device and in a preferred embodiment is implemented as a Field Programmable Gate Array (FPGA).

The memory 234 can be any type of memory device including but not limited to synchronous dynamic random access memory (SDRAM), dynamic random access memory (DRAM), any combination of memory technologies, and the like. Preferably, the memory 234 is a 256 megabyte (MB) SDRAM.

A set of buffers is provided that amplify the signals used to access the memory 234. There is a data buffer 229, an address buffer 231, and a control buffer 233. The address buffer 231 receives the address signals generated from the memory controller 224. The control buffer 233 receives the control signals generated from the memory controller 224 and the data buffer 229 receives data received from the PCI bus 228 or from the memory 234. Preferably, the buffers 229, 231, 233 are implemented as three-state logic buffers and the data buffer 229 is bi-directional.

The operation of the PCI bus 228 is well known in the art. A more detailed description of the PCI bus 228 can be found in Solari and Willse, *PCI Hardware and Software Architecture and Design,* 4th edition, Annabooks (1998), in Mindshare, *PCI System Architecture,* 3rd edition, Addison Wesley (1996), and in *PCI Specification rev.* 2.1 from the PCI Special Interest Group (http://www.pcisig.com), each of which are hereby incorporated by reference as background information.

The fail safe logic unit 226 is used to monitor the operational status of the components of the I/O control logic units 212. Specifically, the fail safe logic unit 226 is used to detect when there is a memory failure or failure elsewhere. Often this occurs when an uncorrectable number of transmission errors are detected. In this instance, the I/O control logic unit 212 associated with the failed memory 234 terminates operation and the alternate I/O control logic unit 212 resumes the tasks of the failed I/O control logic unit 212.

The fail safe logic unit 226 is connected to a parity logic unit 236. The parity logic unit 236 is used to encode data with parity bytes and to decode data read from the memory 234. The parity logic unit 236 can utilize any one of the well-known error correction coding and decoding techniques. In the event data read from the memory 234 contains a number of errors that exceeds a predetermined threshold, the parity logic unit 236 asserts an error signal 238 which is transmitted to the fail safe logic unit 226. In response, the fail safe logic unit 226 generates a local fail signal 282 and an external fail signal 284. The local fail signal 282 is transmitted to the memory controller 224 and the external fail signal 284 is transmitted to the memory controller 224 on the alternate I/O control logic unit 212. The operation of these signals will be described in more detail below.

Figure 5A:
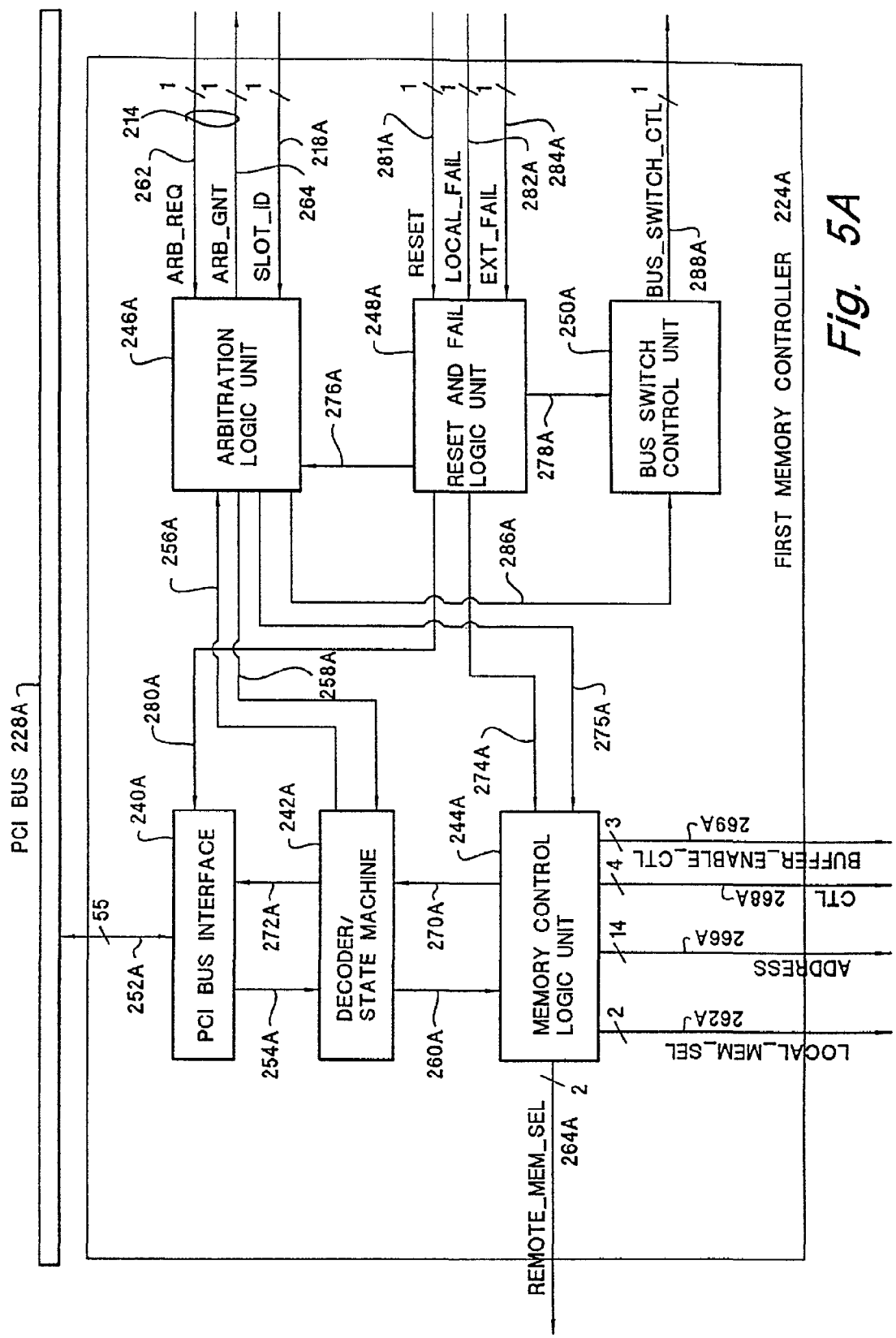
FIG. 5A is a block diagram illustrating the components of the first memory controller shown in FIG. 4 in accordance with a preferred embodiment of the present invention.
Figure 5B:
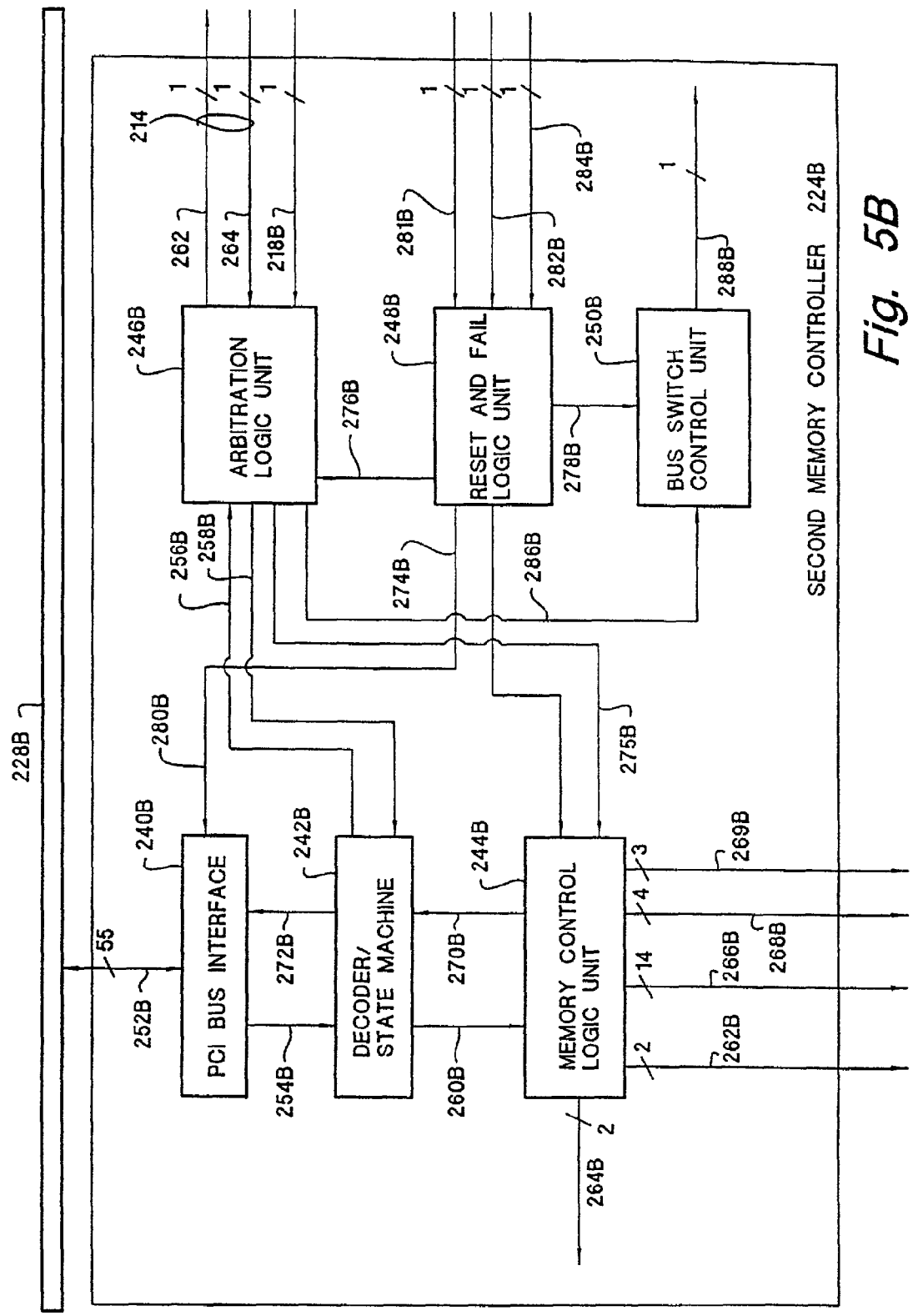
FIG. 5B is a block diagram illustrating the components of the second memory controller shown in FIG. 4 in accordance with a preferred embodiment of the present invention.

FIG. 5A illustrates the first or master memory controller 224A and FIG. 5B illustrates the second or slave memory controller 224B. Both memory controllers 224 have identical components and only differ with respect to the direction of the transfer of the arbitration request 262 and grant 264 signals. As such, the description of the memory controller 224 is discussed with respect to FIG. 5A and is intended to describe both memory controllers 224 except where distinctions are noted.

A task of a memory controller 224 is to ensure that the data in both of the memories 234 is consistent. Preferably, the master 110 control logic unit 212A receives the I/O transactions from the host server 202. The memory 234A associated with the master I/O control logic unit 212A is used to process the I/O transactions rather than the memory 234B associated with the slave I/O control logic unit 212B. The master memory controller 224A receives commands requesting read and write access to the memory 234A. In the case of a memory read command, the master memory controller 224A preferably reads from its local memory 234A. However, it should be noted that the memory controller 224A has the capability to read from the remote memory 234B instead of the local memory 234A which may be desired in certain circumstances. In the case of a memory write command, the master memory controller 224A preferably executes the memory write concurrently in both memories 234A, 234B. However, it should be noted that the memory controller 224A has the capability to write to either memory 234 if so desired.

Referring to FIG. 5A, each memory controller includes a PCI bus interface 240A, a decoder/state machine 242A, a memory control logic unit 244A, an arbitration logic unit 246A, a reset and fail detection logic unit 248A, and a bus switch control unit 250A.

The PCI bus interface 240A interacts with the PCI bus 228A in accordance with the PCI bus protocol in order to receive transactions intended for the memory controller 224A. These transactions can be used to access data stored in the memory 234A. The PCI bus interface 240A receives control, address, and command signals 252A from the PCI bus 228A. In addition, the PCI bus interface 240A transmits control signals 252A indicating the completion of a bus cycle. Preferably, the control signals 252A include a 32-bit address/data signal, a 8-bit command/byte enable signal, a 11-bit control signal, a 2-bit reset and clock signal, and a 2-bit parity signal. The PCI bus interface 240A is coupled to a decoder/state machine 242A to which the PCI bus interface 240A transmits the address and command data received from the PCI bus 228A.

The decoder/state machine 242A is used to determine the appropriate set of actions that need to be initiated in order to service the command. The decoder/state machine 242A is connected to the arbitration logic unit 246A and the memory control logic unit 244A. The decoder/state machine 242A receives the address and command signals 254A from the PCI bus interface 240A and generates an address/command signal 260A that is transmitted to the memory control logic unit 244A. In the case of a memory write command, the decoder/state machine 242A requests access to the memory bus 230B of the slave I/O control logic unit 212B by asserting a request signal 256A to the arbitration logic unit 246A. When such access is obtained, the decoder/state machine 242A receives a grant signal 258A from the arbitration logic unit 246A.

The master arbitration logic unit 246A is used to control access to both memory buses 230. By default, the I/O control logic unit 212A acting as the master has priority to the slave memory bus 230B. The master is given priority since it needs to perform memory write operations simultaneously in both memories. The arbitration logic units 246 in both I/O control logic units 212 are connected through sideband signals 214 which include a one-bit request signal 264, ARB_REQ, and a one-bit grant signal 262, ARB_GNT.

The ARB_REQ signal 262 is used by the slave I/O control logic unit 212B to request access to either the master or slave memory bus 230 from the master arbitration logic unit 246A. The ARB_GNT signal 264 is used to grant to the slave I/O control logic unit 212B access to the master or slave memory bus 230. If during the grant period to the slave I/O control logic unit 212B, the master I/O control logic unit 212A requires access to either the master or slave memory bus 230, the master arbitration logic unit 246A de-asserts the ARB_GNT signal 264. In this case, the slave I/O control logic unit 212B aborts the bus cycle and de-asserts the ARB_REQ signal 262. The master I/O control logic unit 212A drives the memory bus 230B once the ARB_REQ signal 262 is de-asserted. The slave arbitration logic unit 246B can reassert the ARB_REQ signal 262 one clock cycle after the ARB_REQ signal 262 was de-asserted.

The arbitration logic unit 246 receives from the management control logic unit 216 a PCI slot identification signal 218, slot_id, that is used to determine whether the I/O control logic unit 212 is either the master or the slave I/O control logic unit 212. Preferably, a one-bit first slot_id signal 218A is transmitted to the arbitration logic unit 246A in the first I/O control logic unit 212A and is used to indicate that the first I/O control logic unit 212A is the master device. Likewise, a one-bit second slot_id signal 218B is transmitted to the arbitration logic unit 246B in the second I/O control logic unit 212B and indicates to the second I/O control logic unit 212B that it is the slave device.

In an alternate embodiment, in addition to the slot_id signal, a register in the memory controller 224 stores a bit pattern indicating whether the memory controller 224 is the master or slave device. The processor 219 writes the bit pattern into the register of the memory controller 224 at system initialization or during a switchover of control from the master I/O control logic unit 212A to the slave I/O control logic unit 212B, and the like. When the processor is engaged to write the bit pattern to the register, the memory controller 224 uses the value stored in the register instead of the slot_id signal.

The memory control logic unit 244A is connected to the reset and fail detection logic unit 248A, the decoder/state machine 242A, and the memory 234A. The memory control logic unit 244A receives signals 260A requesting either a read or write memory access and generates the corresponding signals to enable the requested access. The memory control logic unit 244A asserts a local memory select signal 262A for read accesses that are made to the memory 234A local to the I/O control logic unit 212A. A remote memory select signal 264A is asserted by the master I/O control logic unit 212A in order to select the memory 234B of the slave I/O control logic unit 212B. An address signal 266A is also generated that represents the intended memory address in addition to a read/write control signal 268A. A buffer enable signal 269A is also generated by the memory control logic unit 244A in order to enable the data buffer 229A when the memory controller 224A has access to the associated memory bus 230A. These signals 262A, 266A, 268A, 269A are transmitted to the respective buffers 229A, 231A, 233A. Preferably, the remote memory select signal 264A is two-bits wide, the local memory select signal 262A is two-bits wide, the address signal 266A is 14-bits wide, the read/write control signal 268A is 4-bits wide and the buffer enable signal 269A is 3-bits wide.

At the completion of the memory access cycle, the memory control logic unit 244A asserts a first completion signal 270A that is transmitted to the decoder/state machine 242A. Upon receipt of the completion signal 270A, the decode/state machine 242A asserts a second completion signal 272A to the PCI bus interface 240A. The PCI bus interface 240A, in turn, asserts the appropriate PCI bus signals to signify completion of the memory access command when it receives the second completion signal 272A.

The reset and fail logic unit 248A serves to control the operational state or mode of the memory controller 224A. The reset and fail logic unit 248A receives three input signals which indicate one of three operational modes: initialization mode; shutdown mode; or sole control mode. In initialization mode, the memory controller 224A takes the necessary steps to initialize its operation such as setting all registers to default values and setting the state machine to start or idle position. This mode is set at power-on or when the I/O control logic unit 212A is rebooted. Shutdown mode is used to terminate the operation of the memory controller 224A. This can be done in response to a memory failure or the like. In sole control mode, the memory controller 224 does not need to synchronize memory write accesses with the alternate I/O control unit 212B since the alternate I/O control logic unit 212B is no longer operational.

The reset and fail logic unit 248A receives three input signals: a one-bit reset signal 281A; a one-bit local fail signal 282A, local_fail; and a one-bit external fail signal 284A, ext_fail. The reset signal 281A is transmitted from the management control logic unit 216 and serves to notify the reset and fail logic unit 248A that the memory controller 224A is to initiate the initialization mode sequence of operations. A local fail signal, local_fail 282A, is transmitted from the fail safe logic unit 226A and indicates a memory failure associated with the I/O control logic unit 212A. In this case, the memory controller 224A enters into shutdown mode. The external fail signal 284A indicates a memory failure from the alternate I/O control logic unit 212B. In this case, the memory controller 224 of the non-failed I/O control logic unit 212 enters into sole operation mode.

The reset and fail logic unit 248A prepares the memory controller 224A for shutdown mode when either the reset signal 281A or the local fail signal 282A is asserted. In this case, the reset and fail logic unit 248A asserts a first fail signal 274A to the memory control logic unit 244A, a second fail signal 276A to the arbitration logic unit 246A; a third fail signal 278A to the bus switch control unit 250A, and a fourth fail signal 280A to the PCI bus interface 240A. In response to these signals 274A, 276A, 278A, 280A, the corresponding units 240A, 244A, 246A, 250A take the necessary steps to terminate processing and initialize all registers (not shown) in the memory controller 224A to a default value.

The reset and fail logic unit 248A prepares the memory controller 224A for initialization mode when the reset signal is de-asserted. In this case, the reset and fail logic unit 248A de-asserts the first fail signal 274A to the memory control logic unit 244A, the second fail signal 276A to the arbitration logic unit 246A, the third fail signal 278A to the bus switch control unit 250A, and the fourth fail signal 280A to the PCI bus interface 240A. In response to these signals 274A, 276A, 278A, 280A, the corresponding units 240A, 244A, 246A, 250A perform those operations which initialize their respective units.

When the external fail signal 284A is asserted, the reset and fail logic unit 248A prepares the memory controller 224A for sole control mode. In this case, the arbitration logic unit 246A is disabled when the reset and fail logic unit 248A de-asserts the second fail signal 276A. The arbitration logic unit 246A is disabled since there may be no need for the slave memory controller 224B to arbitrate for its memory bus 230B or for the master memory controller to access the slave memory bus 230B. In response, the arbitration logic unit 246A disables the bus switches (not shown) by asserting the third fail signal 278A which is transmitted to the bus switch control unit 250A. In this case, the bus switches are disabled since there is no need to exchange data between the two memory buses 230A, 230B.

The bus switch control unit 250A is used to control the operation of a set of bus switches that control the transfer of data between the two memory buses 230A, 230B. The bus switch control unit 250A receives a control signal 286A from the arbitration logic unit 246A that is used to control the state of a one-bit bus switch control signal 288A, bus_switch_ctl. The bus switch control signal 288A controls the bus switches associated with the memory bus 230A. When the third fail signal 278A is de-asserted, the bus switch control unit 250A enables the bus switch control signal 288A thereby enabling the bus switches. When the third fail signal 278A is asserted, the bus switch control unit 250A disables the bus switch control signal 288A thereby disabling the bus switches. The operation of the bus switches will be described in more detail below.

Figure 6:
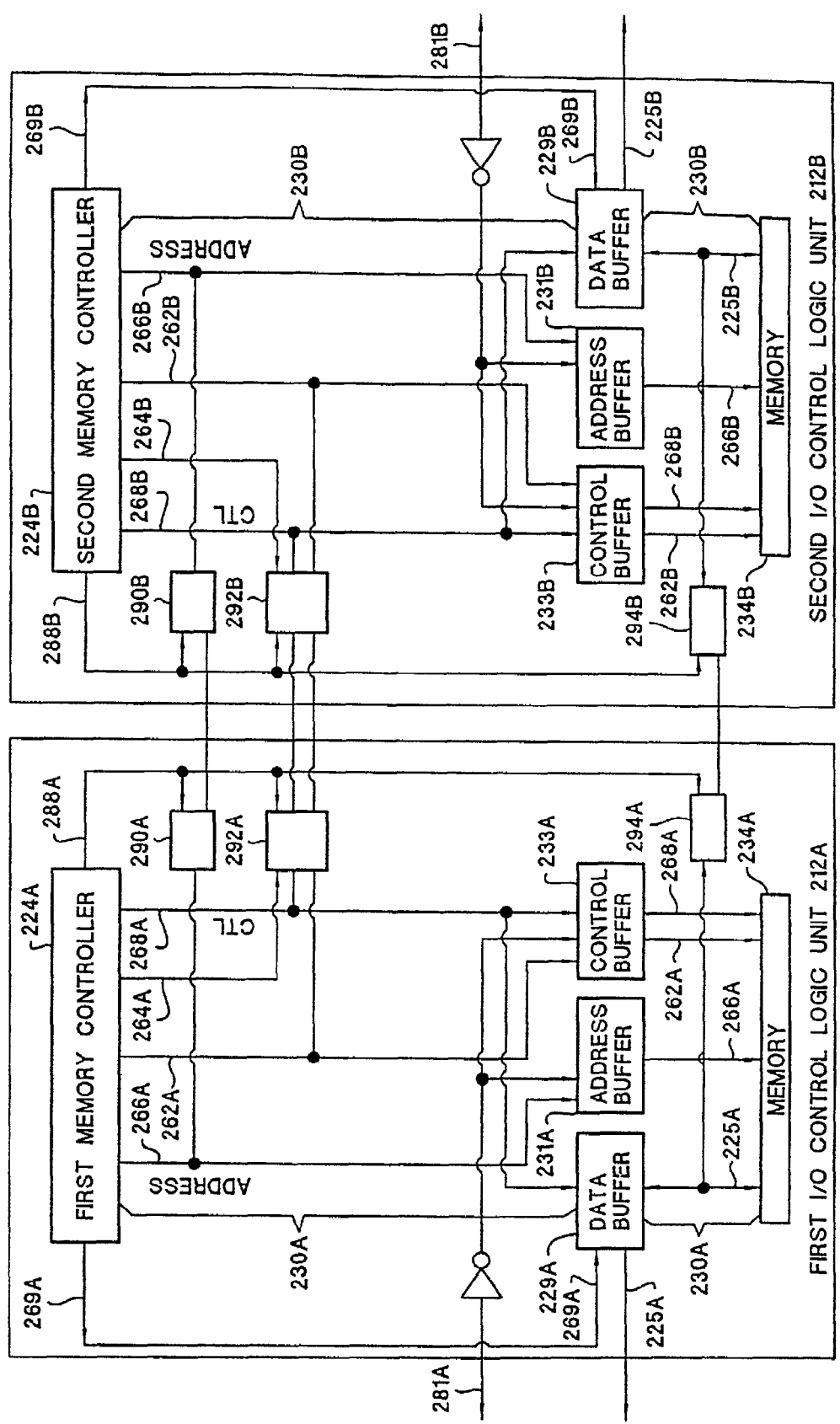
FIG. 6 illustrates the memory bus signal paths in accordance with a preferred embodiment of the present invention.

FIG. 6 illustrates the memory bus 230 and bus switches 290, 292, and 294 in each I/O control logic unit 212. Each memory bus 230 is composed of a number of signal paths (i.e., lines or traces) that carry address, data, and control signals. The address signals 266 are generated by the memory controller 224. The data signals 225 are received from the PCI bus 228. The control signals include a local memory select signal 262, a remote memory select signal 264, and a read/write control signal 268A.

Each I/O control logic unit 212 has a set of bus switches coupled to the signal paths of its memory bus 230. The bus switches are used to exchange data between the two memory buses 230A, 230B. Each I/O control logic unit 212 has an address-signal bus switch 290, a control-signal bus switch 292, and a data-signal bus switch 294. Each switch 290, 292, 294 is coupled to the bus switch control signal 288 that is used to enable or disable the switches 290, 292, 294 simultaneously. The operation of bus switches is well known in the art. Preferably, the bus switches are the 32QX861 QuickSwitch® bus switches provided from Quality Semiconductor, Inc.

A first address-signal bus switch 290A is coupled to the address signal path 266A of the first memory bus 230A and to a second address-signal bus switch 290B associated with the second memory bus 230B. The first address-signal bus switch 290A is under the control of the first bus-switch control signal 288A that is generated by the first memory controller 224A. Likewise, the second address bus switch 290B is under the control of the second bus-switch control signal 288B which is generated from the second memory controller 224B. When both address-signal bus switches 290A, 290B are engaged, the data values of the first address signal 266A are transmitted to the address signal path 266B of the second memory bus 230B.

A first control-signal bus switch 292A is coupled to the control signal paths 264A, 268A of the first memory bus 230A and to a second control-signal bus switch 292B associated with the second memory bus 230B. The first control-signal bus switch 292A is under the control of the first bus-switch control signal 288A that is generated by the first memory controller 224A. Likewise, the second control-signal bus switch 290B is under the control of the second bus-switch control signal 288B which is generated from the second memory controller 224B. When both control-signal bus switches 290A, 290B are engaged, the values of the remote memory select control signal 264A are transmitted to the local memory select signal path 262B in the second memory bus 230B and the values of the read/write control signal 268A are transmitted to the read/write control signal path 268B in the second memory bus 230B.

A first data-signal bus switch 294A is coupled to the data signal path 225A of the First memory bus 230A and to a second data-signal bus switch 294B associated with the second memory bus 230B. The first data-signal bus switch 294A is under the control of the first bus-switch control signal 288A that is generated by the first memory controller 224A. Likewise, the second data-signal bus switch 294B is under the control of the second data-switch control signal 288B which is generated from the second memory controller 224B. When both data-signal bus switches 294A, 294B are engaged, the values of the first data signal 225A are transmitted to the data signal path 225B of the second memory bus 230B.

The placement of the bus switches 290, 292, 294 is advantageous for several reasons. The address-signal and control-signal bus switches 290, 292 are positioned before the address and control buffers 231, 233 in order to preserve the integrity of these signals when they reach the respective memory 234. The data-signal bus switches 294 are positioned after the data buffer 229 so that the data signals do not interfere with the operation of the PCI bus 228.

Each buffer is controlled by a respective enable control signal. Each memory controller 224 generates a data buffer control signal 269 that is used to enable or disable the data buffer 229. The reset signal 281 is used to control both the address and control buffers. The address and control buffers in each I/O control logic unit 212 are enabled at system initialization. The data buffer in each I/O control logic unit 212 is enabled when the respective memory controller 224 has access to its own memory bus 230. For example, when the master memory controller 224A has access to both the master and slave memory bus 230A, 230B, the master data buffer 229A is enabled and the slave data buffer 229B is disabled. When the slave memory controller 224 has access to its own memory bus 230B, the slave data buffer 229B is enabled.

The foregoing description has described the electronic components and devices that are part of the I/O controller 204 of the present technology. Attention now turns to a description of the manner in which the I/O controller 204 operates, specifically the manner in which the redundant memories are synchronized.

The I/O controller 204 receives I/O transactions from either the host server 202 or the external peripheral devices 206. These I/O transactions may require a read or write access to the memory 234. The master memory controller 224A receives memory read and write commands from the PCI bus 228. A memory read command accesses the memory 234A local to the master I/O control logic unit 212A and does not require any interaction with the slave memory 234B. A memory write command is performed simultaneously at both memories 234A, 234B in order to maintain the memories 234 in a consistent state. In order to facilitate this concurrent memory write access, the memory bus 230 and the arbitration signals 262, 264 are operated in accordance with a protocol that facilitates this access while minimizing the amount of circuitry used and by minimizing the transmission delay incurred in accessing the slave memory 230B.

Figure 7:
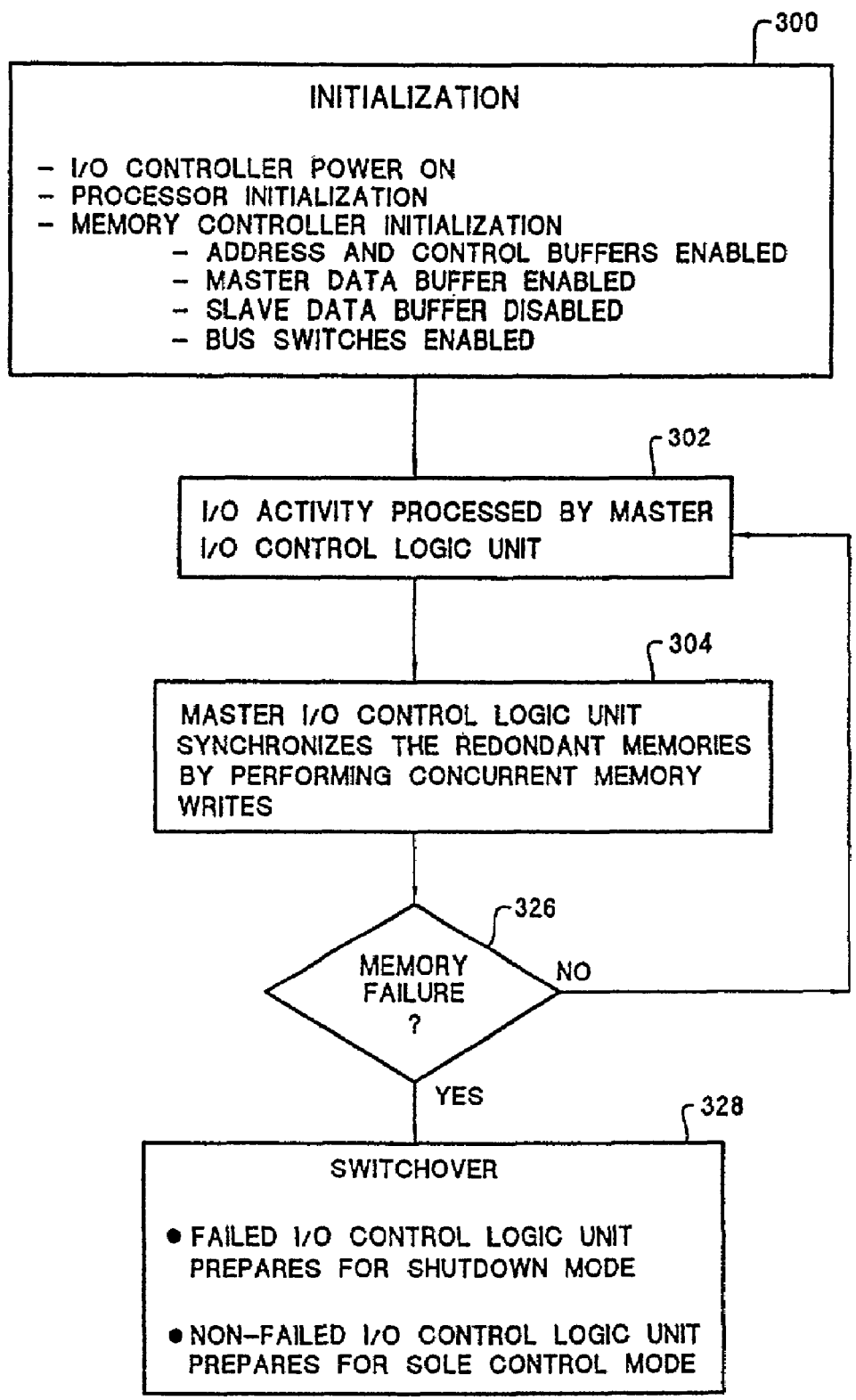
FIG. 7 is a flow chart illustrating the operation of the I/O controller in a preferred embodiment of the present invention.

FIG. 7 illustrates the operation of the I/O controller 204 with respect to a concurrent memory write access in both memories 234. However, it should be noted that the technology of the present invention is not constrained to this particular operation. The master memory controller 224A can perform a memory read operation to the slave memory 234B for testing purposes or the like. In addition, the slave memory controller 224B can initiate a memory write operation to both memories 234 which will utilize the same steps shown in FIG. 7 and perform a read access to the master memory 234A.

Referring to FIG. 7, the I/O controller 204 is initialized when the I/O controller 204 is powered-on (step 300). At this time, the management control logic unit 216 initiates the appropriate sequence of operations to initialize each of the processors 219 in each I/O control logic unit 212 (step 300). Each processor 219 in turn initializes its associated memory controller 224. In particular, each processor 219 de-asserts the reset signal 281 in order for its respective memory controller 224 to initialize its internal circuitry (step 300). The reset and fail logic unit 248 in each memory controller 224 receives the reset signal 281 and takes the appropriate actions, as described above with respect to FIG. 5A, to initialize its associated memory controller 224. In addition, the address and control buffers 231, 233 are enabled when the reset signal 281 is de-asserted. Each arbitration logic unit 246 uses the slot_id signal 218 and/or the stored bit pattern to determine whether it operates as the master or the slave I/O control logic unit 212. Once this determination is made, the master arbitration logic unit 246A asserts signal 275 which is transmitted to the memory control logic unit 244A. This signal 275 instructs the master memory control logic unit 244A to assert the buffer enable signal 269A thereby enabling the master data buffer 229A. By default, the master memory controller 224A has access to the slave memory bus 230B. Thus, the slave data buffer 229B is not enabled until the slave memory controller 224B is granted access to the slave memory bus 230B. Once the memory controllers 224 are initialized, I/O activity commences.

Preferably, the master I/O control logic unit 212A handles the I/O activity received from either the external peripheral devices 206 or the host server 202 (step 302). The slave I/O control logic unit 212B operates in a quiescent state and resumes control of the I/O activity in the event the master I/O control logic unit 212A experiences a failure. For this reason, the memory 234A associated with the master I/O control logic unit 212A is used to process the I/O activity. A task of the master memory controller 224A is to ensure that both memories 234A, 234B are synchronized (step 304).

Figure 8A:
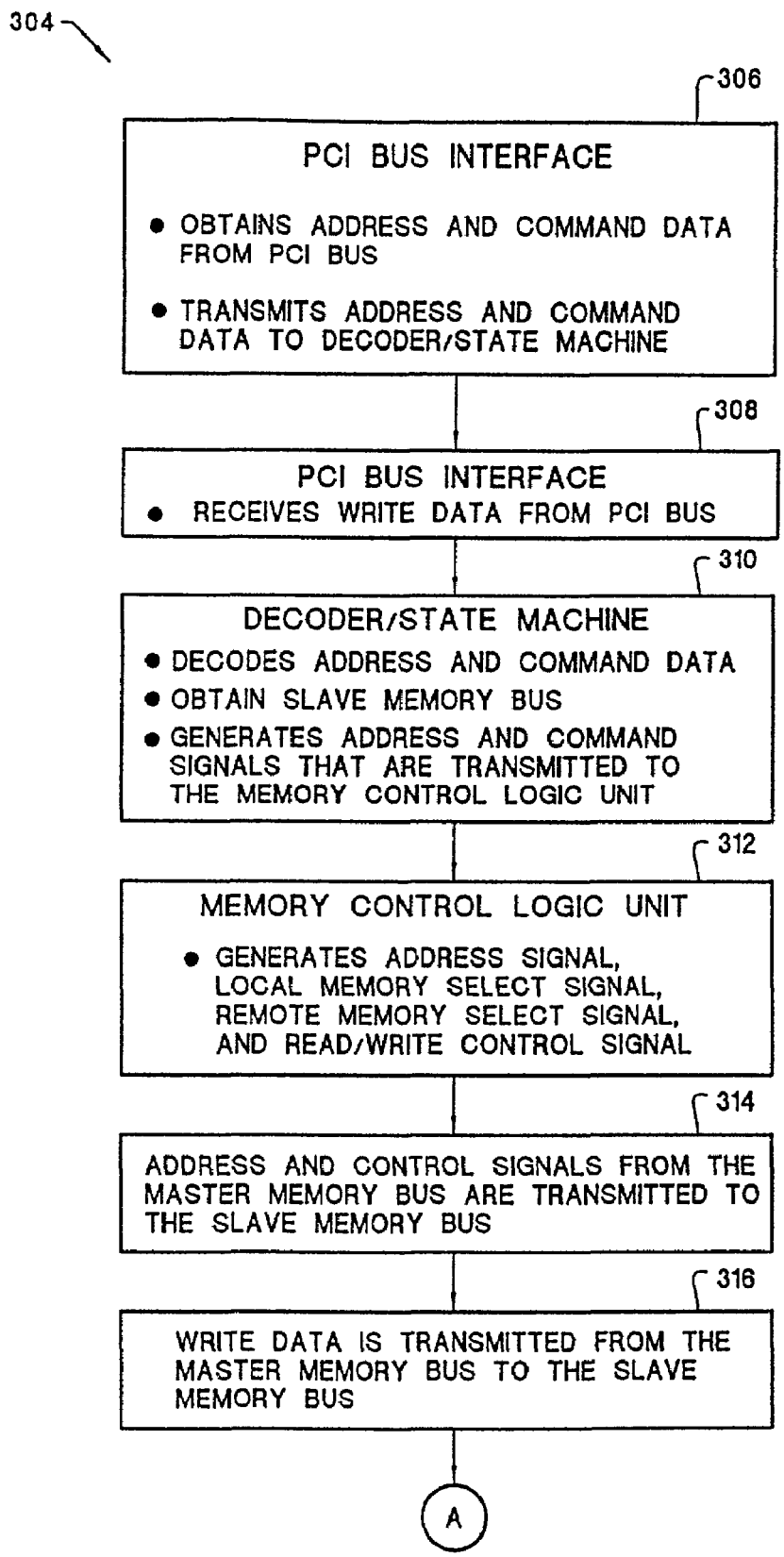
FIGS. 8A–8B are flow charts illustrating the steps used to perform a concurrent memory write operation in accordance with a preferred embodiment of the present invention.
Figure 8B:
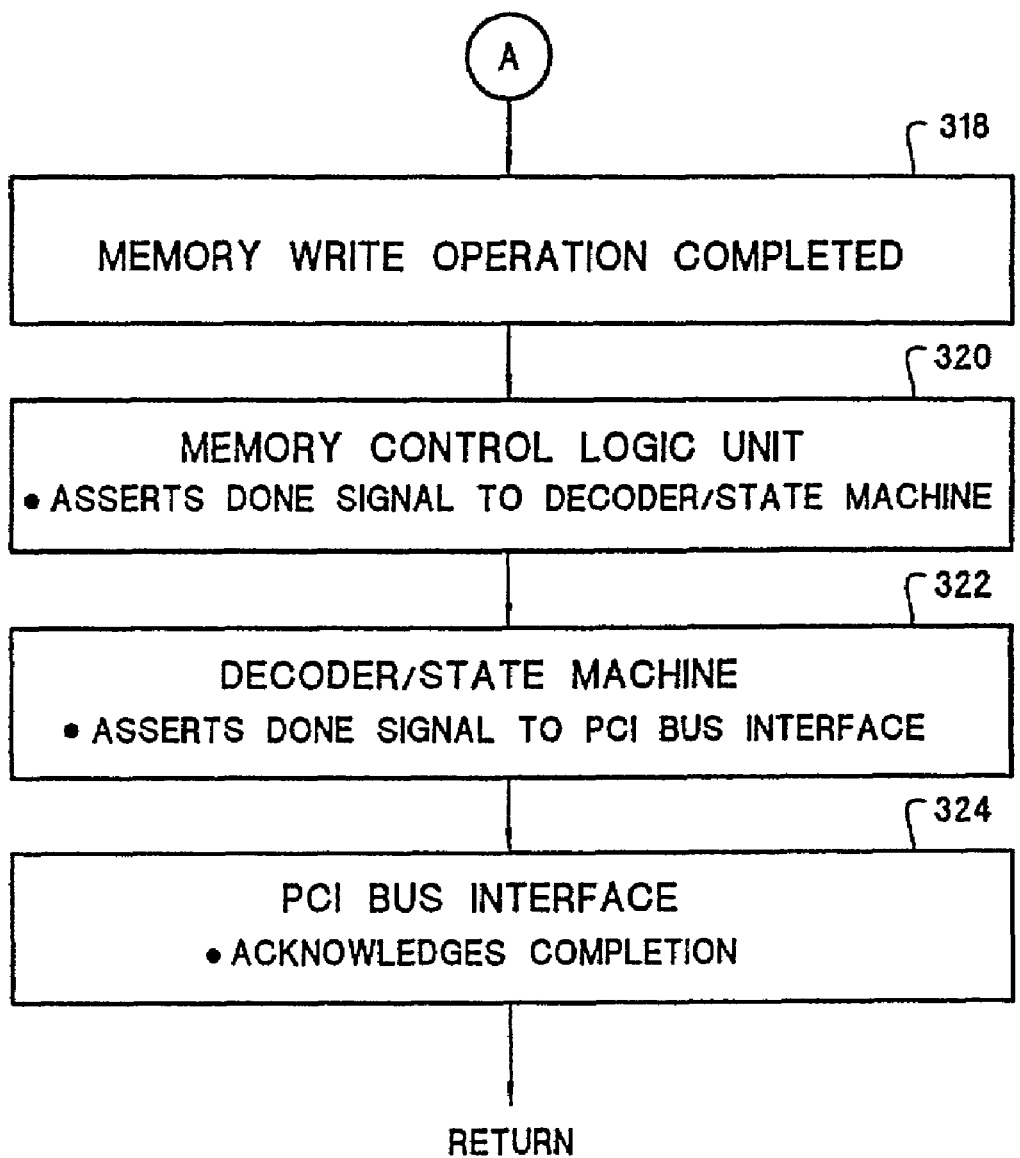

FIG. 8 illustrates the steps used to perform a concurrent memory write operation (step 304). The master memory controller 224A receives from the PCI bus 228 a memory write command and an associated memory address (step 306). The master PCI bus interface 240 obtains the address and command data from the PCI bus 228A in accordance with the PCI bus protocol (step 306). The address and command data is then transmitted to the master decoder/state machine 242A (step 306). In addition, the write data 225A is transmitted directly from the PCI bus 228A to the data buffer 229A (step 308).

The master decoder/state machine 242A decodes the address and command data and determines whether it has access to the slave memory bus 230B (step 310). By default, the master memory controller 224A has access to the slave memory bus 230B which is indicated when the grant signal 258A is asserted. If the master memory controller 224A does not have access to the slave memory bus 230B, the master decoder/state machine 242A asserts the request signal 256A which is transmitted to the master arbitration logic unit 246A. The master arbitration logic unit 246A asserts the grant signal 258A which is transmitted to the master decoder/state machine 242A when access to the bus 230B is obtained.

As noted above with respect to FIG. 5A, the master I/O control logic unit 212A has priority access to the slave memory bus 230B. The master arbitration logic unit 246A asserts the grant signal 258 if the ARB_GNT signal 264 is not asserted. Normally, the grant signal 258A is asserted since the master I/O control logic unit 212A has priority access to the slave memory bus 230B. Since the grant signal 258A is normally asserted, there is no penalty for arbitrating for the slave memory bus 230B. In the event the ARB_GNT signal 264 is asserted, then the slave memory controller 224B has access to the slave memory bus 230B and the master arbitration logic unit 246A de-asserts this signal 264. In response to the ARB_GNT signal 264 being de-asserted, the slave arbitration logic unit 246B de-asserts the ARB_REQ signal 262 thereby causing the master arbitration logic unit 246A to assert the grant signal 258.

Once access to the slave memory bus 230B is granted, the master decoder/state machine 242A generates the appropriate address and command signals 260A which are transmitted to the memory control logic unit 244A (step 310). In response, the memory control logic unit 244A generates the appropriate address and control signals to perform the memory write operation (step 312). These signals include the address signal 266A, the local memory select signal 262A, the remote memory select signal 264A and the read/write control signal 268A which were described above with respect to FIG. 6.

Once the address and control signals associated with the master memory bus 230A are generated, the values of these signals are transmitted to the slave memory bus 230B (step 314). The address and control bus switches 290,292 associated with each memory bus 230A, 230B are enabled as well as the address and control buffers 231, 233 that enable the transmission of these signals from the master memory bus 230A to the slave memory bus 230B. As shown in FIG. 6, the address signal 266A associated with the master memory bus 230A becomes the address signal 266B of the slave memory bus 230B, the remote memory select signal 264A of the master memory bus 230A becomes the local memory select signal 262B of the slave memory bus 230B, and the read/write control signal 268A of the master memory bus 230A becomes the read/write control signal 268B of the slave memory bus 230B.

In addition, the write data 225A is transmitted from the master memory bus 230A to the data signal 225B of the slave memory bus 230B (step 316). The read/write control signal 268 controls the direction of the flow of the data buffer. In the case where the read/write control signal 268 indicates a write access, the data buffer 229 receives data from the PCI bus 228 and outputs the data to the memory 234. In the case where the read/write control signal 268 indicates a read access, the data buffer 229 receives data from the memory 234 and outputs the data to the PCI bus 228.

The memory write operation is then performed (step 318) and acknowledgment of the completion of the memory write operation is initiated. The master memory control logic unit 244 asserts the done signal 270 which is transmitted to the decoder/state machine 242 (step 320) which in turn asserts the done signal 272 to the PCI bus interface 240 (step 322). In response to the done signal 272, the PCI bus interface 240 acknowledges completion of the operation in accordance with the PCI bus protocol (step 324) thereby completing the memory write operation.

Referring back to FIG. 7, the master I/O control logic unit 212A continues processing the I/O activity (step 326-N) until a memory failure is detected (step 326-Y). The memory failure can occur in either the master or the slave I/O control logic unit 212. When the local fail signal 282 is asserted, the associated memory controller 224 is alerted to a memory failure within its associated memory 234. When the external fail signal 284 is asserted, the associated memory controller 224 is alerted that a memory failure occurred in the memory 234 associated with the other I/O control logic unit 212. In either case, the I/O control logic unit 212 associated with the memory failure enters shutdown mode and the other I/O control logic unit 212 enters into sole control mode (step 328).

As described above with respect to FIG. 5A, the reset and fail logic unit 248 that is associated with the memory failure receives an asserted local fail signal 282 and asserts fail signals 274, 276, 278, 280 which instruct the memory control logic unit 244, the arbitration logic unit 246, the bus switch control unit 250, and the PCI bus interface 240 to initiate the appropriate actions to cease operation. The bus switch control unit 250 disables the bus switch control signal 288 thereby disabling the associated bus switches 290, 292, 294. The memory control logic unit 244 de-asserts the buffer enable control signal 269 which in turn disables the data buffer 229.

The reset and fail logic unit 248 associated with the memory 234 that did not experience the memory failure receives an asserted external fail signal 284. In response to this signal 284, the reset and fail logic unit 248 prepares the memory controller 224 for sole control mode. In this case, the arbitration logic unit 246 is disabled through the second fail signal 276 since there is no need for the slave memory controller 224B to arbitrate for its memory bus 230B or for the master memory controller to access the slave memory bus 230B. In response, the arbitration logic unit 246 disables the bus switches 290, 292, 294 by asserting the third fail signal 278 which is transmitted to the bus switch control unit 250. In this case, the bus switches 290, 292, 294 are disabled since there is no need to exchange data between the two memory buses 230A, 230B.

The foregoing description has described a fault tolerant I/O controller having redundant synchronous memories. The fault tolerant I/O controller described herein is advantageous for several reasons, First, a single memory controller is capable of controlling the two memory buses simultaneously. This allows the redundant memories to be preserved in a synchronous state since the concurrent memory write operations occur in a manner having minimal delay. This is attributable in part to the use of the bus switches and the placement of the bus switches.

Furthermore, the memory controller utilizes a small number of input and output signal lines. The memory controller receives 55-bits from the PCI bus 228, utilizes 7-bits for control functions, and generates 25-bits that are used to control the memories. This allows the memory controller to be implemented as a FPGA with a pin count of less than 90 pins. The cost of the FPGA decreases as the pin count decreases thereby reducing the overall cost of the I/O controller. In addition, the minimal pin count reduces the complexity of the memory controller and the space consumed by the memory controller.

Second, the design of the I/O control logic units minimizes the amount of time that it takes to perform a remote memory access. This is due in part that the I/O controller does not utilize bus bridges. Both memories are seen by each memory controller as being virtually local to a particular memory controller and as such do not incur the additional access time required to transverse a bus bridge or the like.

Additionally, the I/O controller is highly reliable since it utilizes redundant I/O control logic units. This affords the I/O controller with the capability to continue operation in the event of a memory failure and improves the overall performance of the server.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

It should be noted that the I/O controller of the present invention is not constrained to two I/O control logic units and is suitable for any number of 110 control logic units. In addition, the present invention has been described with respect to an I/O controller. However, the present invention is not limited to this particular use and is applicable to other interfaces between a server and peripheral devices such as but not limited to a network interface controller and the like.

Furthermore, one skilled in the art can easily modify the I/O control logic units to accommodate the case where both I/O control logic units are acting as master control units and each are processing I/O transactions independently. In the event of a memory failure to one of the I/O control logic units, the non-failed unit would take sole control over processing the I/O transactions. This embodiment would require additional signal paths so that each memory controller can obtain access to the memory bus of the other I/O control logic unit. This access is needed in order to allow each I/O control logic unit to perform concurrent memory write operations.

What is claimed is:

1. A method for controlling a transfer of data between a data processor and a data unit, the method comprising:
    providing a plurality of control units, each control unit having a capability to control the transfer of data between the data processor and the data unit, each control unit having a memory device and signal paths coupled to the memory device, the signal paths enabling access to the associated memory device;
    selecting one of the control units as a master control unit to control the transfer of data between the data processor and the data unit;

designating a second one of the control units as a slave control unit; transferring the data between the data processor and the data unit by employing the memory device in the master control unit; and synchronizing the memory device in the master control unit with the memory device in the slave control unit, the synchronizing including:

generating, in the master control unit, values for the signal paths associated with the master memory device to transfer data to the master memory device;

transferring a subset of the generated signal paths to the signal paths associated with the slave memory device; and allowing the generated signals to perform the data transfer to the master memory device and the slave memory device.

2. The method of claim 1, wherein the generating step further comprises:

generating, in the master control unit, values for the signal paths associated with the slave memory device that enables access to the slave memory device.

3. The method of claim 1, further comprising:

associating an address and control signal path with each memory device that enables access to the corresponding memory device;

the generating step further comprising:

producing values for the address and control signal paths associated with the master memory device; and the transferring step further comprising:

transmitting the address and control signal paths associated with the master memory device to the address and control signal paths associated with the slave memory device.

4. The method of claim 3, further comprising: associating with the master memory device a first control signal that controls access to the slave memory device;

associating with each memory device a second control signal that controls access to the corresponding memory device;

the generating step further comprising: producing values for the first control signal and the second control signal associated with the master memory device; and the transferring step further comprising:

transmitting the first control signal associated with the master memory device to the second control signal associated with the slave memory device.

5. The method of claim 3, further comprising:

associating with each control unit a data signal path; and the transferring step further comprising:

receiving data values for the data signal path associated with the master memory device; and transmitting the received data values to the data signal path associated with the slave memory device.

6. The method of claim 1, further comprising:

associating with the signal paths associated with each memory device a control mechanism that enables a transfer of values from a first signal path to a second signal path; and enabling the control mechanism associated with the master memory device and the control mechanism associated with the slave memory device to transfer values between the master signal paths and the slave signal paths.

7. The method of 6, further comprising:

disabling the control mechanism associated with a memory device to inhibit a transfer and receipt of signal paths values.

8. The method of claim 1, further comprising:

suspending the master control unit from controlling the data transfer between the data processor and the data unit;

enabling the slave control unit to control the transfer of data between the data processor and the data unit; and transferring the data between the data processor and the data unit by employing the memory device in the slave control unit.

9. The method of claim 8, wherein the suspending step further comprises:

determining that the master control unit has experienced an operational failure.

10. The method of claim 9, wherein the determining step further comprises:

receiving an indication that the memory device in the master control unit has failed.

11. The method of claim 1, further comprising:

disabling the master control unit from accessing the slave memory device; and suspending operation of the slave control unit.

12. The method of claim 11, wherein the disabling step further comprises:

determining that the slave control unit has experienced an operational failure.

* * * * *